Aug. 23, 1966 R. B. HANSEN 3,268,656
COLOR TELEVISION RECEIVER INCLUDING COLOR BURST SEPARATOR SUBSTANTIALLY UNAFFECTED BY THE VARYING WAVEFORM AND TIMING OF KEYING PULSES
Filed March 21, 1963
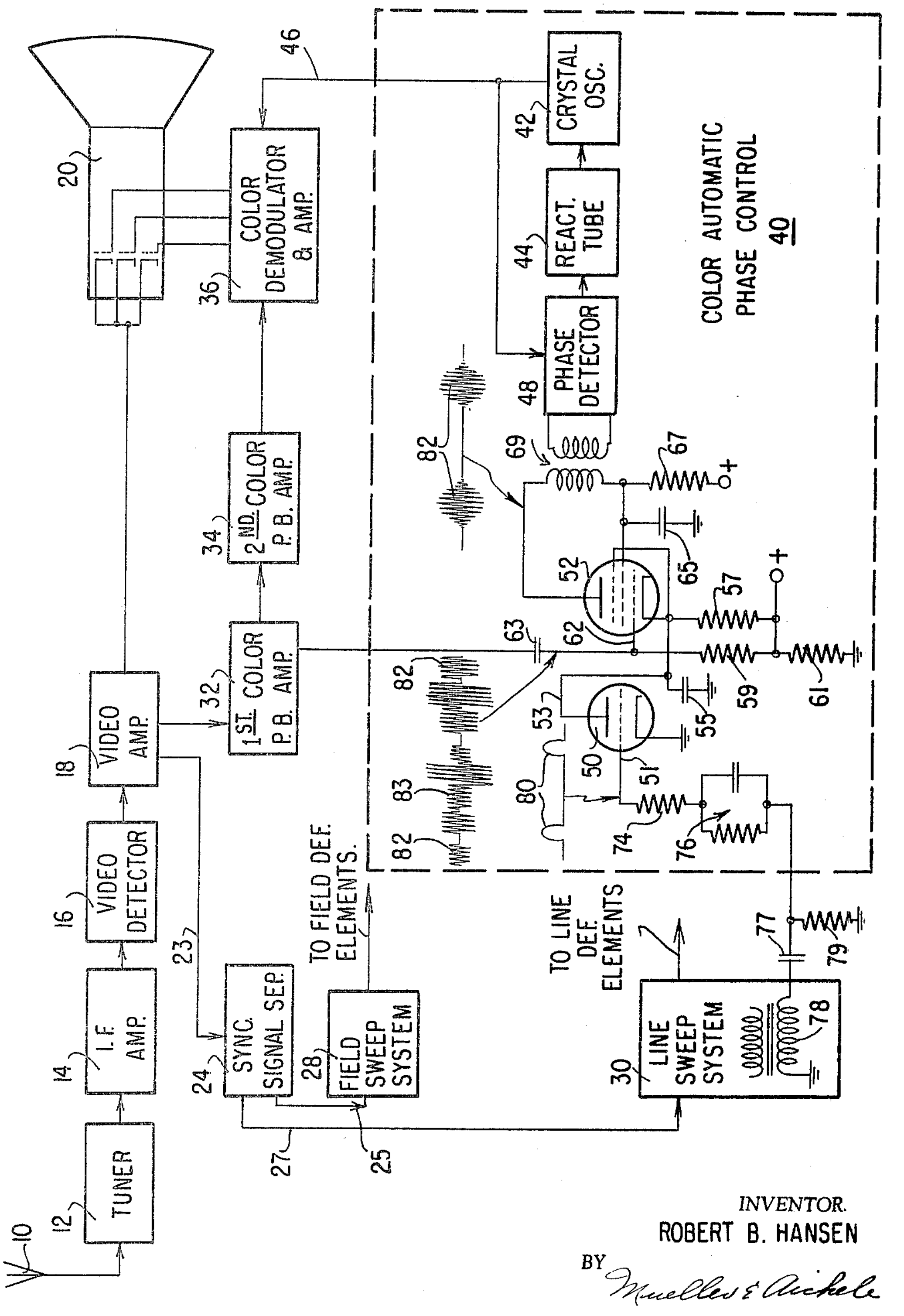
INVENTOR.
ROBERT B. HANSEN
BY Mueller & Aichele
ATTYS.

3,268,656
COLOR TELEVISION RECEIVER INCLUDING COLOR BURST SEPARATOR SUBSTANTIALLY UNAFFECTED BY THE VARYING WAVEFORM AND TIMING OF KEYING PULSES

Robert B. Hansen, Arlington Heights, Ill., assignor to Motorola, Inc., Chicago, Ill., a corporation of Illinois Filed Mar. 21, 1963, Ser. No. 266,862
6 Claims. (Cl. 178—5.4)

This invention relates to color television receivers and more particularly to improved circuit means for deriving the chroma synchronizing reference signals or color burst signals from the received color television signal.

The standardized color television signal, as adapted by the Federal Communications Commission, contains color video signals representing differing primary color intensities which are combined in proper proportions to provide a monochromatic video signal that is compatible for black and white reception on existing monochromatic television receivers. For color reproduction in color television receivers, color difference signals providing phase and amplitude modulation representative of distinct chroma information are interspersed with the color intensity video signals and transmitted as sideband components on a color subcarrier wave of a frequency of approximately 3.58 megacycles. Details of the standardized NTSC compatible color system are known in the art, it being sufficient to note that in a tricolor television system it is only necessary to modulate the color or chroma subcarrier with the blue ($b-y$) and red ($r-y$) color difference signals and to reconstruct the green ($g-y$) color difference signal at the receiver.

To demodulate chroma signals at the receiver and to obtain the respective color difference signals, it is necessary to reinsert the chroma carrier in precise frequency and phase relationship with the suppressed 3.58 mc. subcarrier at the receiver. To this end an automatic phase control system is employed in the receiver, and to provide a reference therefor the composite color video signal contains bursts of a chroma synchronizing reference signal. These bursts, known as color bursts, consist of 8 to 9 cycles of a 3.58 megacycle sine wave and are impressed on the blanking component of the composite video signal, immediately following the synchronizing pulses pedestaled thereon, or as termed in the art, on the "back porch" of the synchronizing pulses. Circuit means are provided in the receiver to remove or separate these bursts from the video signal so that they may be supplied as a reference signal for synchronous demodulation of the color sidebands in the chroma demodulator of the receiver.

In many color burst separator circuits utilizing electronic valve tubes, chroma or composite video signals are applied concurrently with keying pulses derived from the horizontal output transformer of the receiver in a manner to effectively produce a matrixing or combining at the input (usually grid) electrode of the burst separator tube. It is to be understood that in the specification and in the appended claims the term "chroma signal" refers to the color subcarrier sideband components and the color synchronizing bursts, while the term "composite video signal" refers to the entire received television signal, and includes, in addition to chroma signals, monochrome signal components and deflection synchronizing pulses. The keying pulses clamp and gate the burst separator tube into conduction in time coincidence with the color burst signals and an output signal of 3.58 megacycles is derived in a tuned circuit associated with its plate or output electrode. Since the horizontal output transformer may produce keying pulses of varying width and time delay or phasing with respect to the occurrence of color burst signals, such techniques require critical shaping and timing of the keying pulses applied to the burst separator tube. And since both the chroma signal (or the composite video signal) and the keying pulses are effectively applied to the same input electrode of the color burst separator tube such that the transfer characteristics for the color burst signal are influenced by the shaping and timing of the keying pulses, it is usually necessary to compromise the operating characteristics of the burst separator tube so that optimized results cannot be achieved.

It is therefore among the objects of the present invention to provide improved circuit means for separating the color synchronizing reference signal burst from a received composite color television signal.

Another object is to provide, in a color television receiver, a color burst signal separator circuit which is economical to construct and which results in improved performance.

A further object is to provide circuit means of the type described for separating the color reference bursts from the chroma signals in a color television receiver, which circuit means has separate amplifier and gating sections so that optimized color burst signal transfer may be obtained in the amplifier section without critical shaping and timing of keying pulses applied to the gating section.

A feature of the present invention is the provision, in a color television receiver, of circuit means for removing the chroma synchronizing reference burst signals from the received video signal in which the choma signal and the keying pulses are applied to separate input signal paths so that the keying pulses may be provided with sufficient drive to be automatically shaped and the chroma reference signals may be derived therefrom with optimized gain without critical timing of the keying pulses.

Another feature is the provision of a color burst signal separator circuit having a gating section and a color burst signal amplification section wherein separate input means are utilized for the color burst signal and the keying pulses so that the transfer characteristics of the amplification section may be optimized without critical pulse shaping of the keying pulses applied to the gating section of the circuit.

A more specific feature of the invention is the provision, in a color burst separator circuit of the type described, of an electronic valve of the triode type connected as a switch in the conduction path of an electronic valve of the pentode type. The triode is periodically gated into conduction by keying pulses obtained from the line sweep system of the receiver to allow the pentode to translate color bursts accompanying the chroma signal applied to its input grid electrode. Substantially constant plate current is drawn by the pentode throughout the blanking interval of the composite video signal so that the pentode may be biased for maximum gain without regard to the timing or shaping of the keying pulses applied to the diode gate.

Other objects, features and attending advantages of the invention will become apparent from the following description when taken in conjunction with the accompanying drawing, which is a schematic representation of a color television receiver incorporating the invention.

The present invention finds utility in color television receivers of the type adapted to receive NTSC compatible color television signals. To derive the 3.58 megacycle chroma synchronizing reference signal from the received video signal for use as a reference in demodulating the sideband color difference signals of the chroma subcarrier, there is provided a color burst separator circuit having a gating section and a color burst amplification section. By utilizing separate input signal paths for the keying pulses derived from the horizontal output transformer of the receiver and applied to the gating section, and for the chroma signals applied to the color burst amplification section, a switching action takes place in the gating section to result in substantially constant current flow in the amplification section throughout the entire blanking interval of the received composite video signal. As a result keying pulses can be applied to the gating section with sufficient drive to result in automatic pulse shaping and the amplification section may be independently biased for optimum gain of color burst signals.

In a particular form the invention includes a triode vacuum tube, which functions as the aforementioned gating section, connected in series in the conductive path of a standard pentode vacuum tube, which functions as the aforementioned burst amplification section. The keying pulses are coupled to the control grid of the triode tube and switches it into conduction during the entire blanking interval of the received television signal, while the chroma signal is coupled to the control grid of the pentode so that color bursts occurring during the blanking interval are amplified and developed as a reference signal in the output or plate circuit of the pentode.

Referring now to the drawing, the color television receiver therein shown includes tuner 12 to receive and convert incoming color television signals appearing at antenna 10. Tuner 12 may include, for example, the RF stages of the receiver as well as the first detector or mixer and associated local oscillator. The output intermediate frequency signal developed by tuner 12 is coupled through intermediate frequency (IF) stages 14 to the second detector or video detector 16. The detected composite video signal is supplied to the video amplifier 18. The output of video amplifier 18 is coupled to the multiple cathodes of cathode ray color image reproducing device 20. Such an image producing device is known in the art and is operable to provide a color picture reproduction with reception of the standardized composite color television signal.

A portion of the detected composite video signal is supplied from video amplifier 18 on lead 23 to the input of synchronizing signal separator circuit 24. This circuit functions in the known manner to derive synchronizing pulses in response to the synchronizing signal portion of the detected composite video signal. Accordingly, synchronizing pulses are supplied on leads 25 and 27 to field sweep system 28 and line sweep system 30, respectively. The output of field sweep system 28 is coupled to field deflection elements (not shown) of color image reproducer 20. The output of line sweep system 30 is coupled to the line deflection elements (also not shown) of image reproducer 20.

Only the brightness signal (*y*) component and the horizontal blanking component of the composite video signal is developed at the output of video amplifier 18 to be supplied to the cathodes of image reproducer 20. To provide color reproduction a portion of the detected composite video signal developed in video amplifier 18 is coupled to first color pass-band amplifier 32. This unit is tuned to pass a frequency band of substantially 2–4.2 mc. to pass the chroma signal, which includes color reference signal bursts (3.58 mc.) and the chroma subcarrier sideband components representing the (*b*–*y*) and (*r*–*y*) color difference signals. The chroma signal is further coupled by second color pass-band amplifier 34 to the input of color demodulation and amplification system 36. The demodulated (*b*–*y*) and (*r*–*y*) color difference signals are further matrixed therein to derive a (*g*–*y*) color difference signal, and all three are supplied to respective grid electrodes of image reproducing device 20 so that the cathode ray beams therein may each be modulated by a different one of the three primary colors.

To provide demodulation of the chroma subcarrier sidebands, color demodulator 36 includes synchronous detection circuits and accordingly requires a properly phased reference signal from color automatic phase control (APC) system 40. This system includes an APC loop comprised of oscillator 42, reactance tube circuit 44 and phase detector 48 to provide a reference signal on lead 46 which is locked in phase and frequency with the color reference bursts that are separated from the chroma signal.

The color burst separator circuit for deriving reference bursts from the chroma signal includes gating tube 50 and burst amplifier tube 52. Gating tube 50 is an electron valve of the triode type, while burst amplifier tube 52 is an electron valve of the pentode type. Conveniently they may be contained as separate sections in the same vacuum envelope. The cathode electrode of tube 50 is connected to ground reference potential while its plate electrode is direct current coupled to the cathode electrode of tube 52 by lead 53. Capacitor 55 provides a high frequency bypass for the common connection of the plate electrode of tube 50 and the cathode electrode of tube 52. Plate voltage for tube 50 is supplied from a source of positive potential through resistor 57. Because of the series connection of tubes 50 and 52, the cathode electrode of tube 52 is also maintained at this potential. The voltage dividing network including resistors 59 and 61 provide grid voltage for the control grid electrode 62 of tube 52, which voltage is negative with respect to its cathode potential. Chroma signals, as derived from first color pass-band amplifier 32, are coupled to control grid 62 by capacitor 63. The suppressor grid of tube 52 is returned to its cathode electrode, while its screen grid bypassed by capacitor 65, receives a potential through resistor 67 from a positive source. This positive potential is also supplied through the primary winding of transformer 69 to the plate electrode of tube 52. The secondary winding of transformer 69 is coupled to an input of phase detector 48.

Control grid 51 of tube 50 is connected by resistor 74, RC network 76 and coupling capacitor 77 to winding 78 on the horizontal output transformer located in line sweep system 30. Winding 78 develops a series of positive going pulses which occur in time coincidence with the horizontal blanking interval of the detected composite video signal. Resistor 79 provides a grid return for tube 50, and in conjunction with capacitor 77 produces self-biasing. Accordingly, tube 50 is normally held in a cutoff condition and is gated into conduction when the positive going keying pulses 80, which occur in time coincidence with the horizontal blanking interval of the detected composite video signal, are coupled to grid electrode 51. Conduction of tube 50 completes the cathode return path for tube 52, and with keying pulses 80 providing sufficient drive to result in grid current flow in tube 50, substantially constant plate current is drawn by tube 52 throughout the blanking interval.

The chroma signal coupled to grid electrode 62 of tube 52 contains color burst reference signals 82 and color sideband components 83. It is to be noted that color reference bursts 82 occur in time coincidence with keying pulses 80 so that when tube 50 is gated into conduction they are amplified and translated by tube 52 to appear as reference signals in the primary winding of transformer 69.

The resulting 3.58 megacycle oscillations are coupled by transformer 69 to the input of phase detector 48, which is sharply tuned to this frequency. A second input for phase detector 48 is supplied from the output of crystal oscillator 42. Phase and frequency differences between the color reference bursts and the output of oscillator 42 are detected in phase detector 48 and provided as a control signal to reactance tube 44, which in turn corrects the output of oscillator 42. Thus, phase detector 48, reactance tube 44 and oscillator 42 provide an automatic phase control loop to supply a precisely controlled reference frequency on lead 46 to color demodulator 36 for synchronous demodulation of chroma signals obtained from second color pass-band amplifier 34.

It can be seen from the foregoing that tube 50 functions as a switch to allow substantially constant plate current to flow in tube 52 during the entire period that color reference bursts are present at its grid electrode. Thus it is possible to bias tube 52 to provide optimum transfer of burst reference signals without regard to the shaping and timing of keying pulses supplied to tube 50. Separate gating and chroma inputs allows gating tube 50 to draw sufficient grid current when keying pulses are applied to provide a desirable lower impedance input condition without adversely affecting the transfer characteristics of burst amplifier tube 52.

In a practical circuit constructed in the manner shown in the drawing, the following component values were used:

| | |
|---|---|
| Triode **50** | ½6BL8. |
| Pentode **52** | ½6BL8. |
| Capacitor **55** | 390 picofarads. |
| Resistor **57** | 2200 ohms. |
| Resistor **59** | 100,000 ohms. |
| Resistor **61** | 270,000 ohms. |
| Capacitor **63** | 100 picofarads. |
| Capacitor **65** | .01 microfarad. |
| Resistor **67** | 1,000 ohms. |
| Resistor **74** | 56,000 ohms. |
| RC network **76** | 820,000 ohms–.01 microfarad. |

The invention provides, therefore, an economical and efficient circuit means for deriving the color reference bursts from a received color television signal. By providing separate input signal paths for the keying pulses and the chroma signals, it is possible to optimize the chroma amplifier section of the burst separator for maximum gain without critical timing and shaping of the keying pulses applied to the gating section of the burst separator.

I claim:

1. In a color television receiver for receiving a composite color television signal which includes a chroma signal having one color subcarrier component and a color burst reference signal component having a predetermined frequency and phase relationship with the subcarrier component, color bursts separator circuit means including in combination, first electron valve means having input, output and common electrodes, second electron valve means having at least input, output and common electrodes, means connecting the common electrode of said first electron valve means to ground reference potential, means providing direct current connection between the common electrode of said second electron valve means and the output electrode of said first electron valve means, means for coupling keying pulses to the input electrode of said first electron valve means, said keying pulses occurring in time coincidence with the blanking interval of said composite color television signal, means for coupling the chroma signal to the input electrode of said second electron valve means, and circuit means coupled with the output electrode of said second electron valve means for deriving amplified color burst reference signals therefrom, with said keying pulses gating said first electron valve means into conduction during the blanking interval of said composite color television signal, whereby amplification of color burst reference signals by said second electron valve means is unaffected by varying waveform and timing of keying pulses applied to said first electron valve means.

2. In a color television receiver for receiving a composite color television signal which includes a chroma signal having at least one color subcarrier component and a color burst reference signal component having a predetermined frequency and phase relationship with the subcarrier component, color burst signal separator circuit means including in combination, first electron valve means having control grid, anode and cathode electrodes, second electron valve means having at least control grid, anode and cathode electrodes, means connecting the cathode electrode of said first electron valve means to ground reference potential, means providing direct current connection between the cathode electrode of said second electron valve means and the anode electrode of said first electron valve means, means for coupling keying pulses to the control grid electrode of said first electron valve means, said keying pulses occurring in time coincidence with the blanking interval of said composite color television signal, means coupling the chroma signal to the control grid electrode of said second electron valve means, and circuit means coupled with the anode electrode of said second electronic valve means for deriving amplified color burst reference signals therefrom, with said keying pulses gating said first electron valve means into conduction during said blanking intervals, whereby amplification of color burst reference signals by said second electron valve means is unaffected by varying waveform and timing of keying pulses applied to said first electron valve means.

3. In a color television receiver for receiving a composite color television signal which includes a chroma signal having at least one color subcarrier component and a color burst reference signal component having a predetermined frequency and phase relationship with the subcarrier component, color burst separator circuit means including in combination, a vacuum tube triode, a vacuum tube pentode, means connecting the cathode electrode of said triode to ground reference potential, means providing direct current connection between the cathode electrode of said pentode and the anode eelctrode of said triode, means providing a high frequency by-pass to ground reference potential for the cathode electrode of said pentode, means for coupling keying pulses to the control grid electrode of said triode, said keying pulses occurring in time coincidence with the blanking interval of said composite color television signals, means coupling a chroma signal to the control grid electrode of said pentode, and circuit means coupled with the anode electrode of said pentode for deriving amplified color burst reference signals therefrom, with said keying pulses gating said triode into conduction during said blanking interval so that said pentode amplifies color burst reference signals occurring during said blanking interval substantially independently of varying waveform of timing of said keying pulses.

4. Color burst reference signal separator circuit means for use in a television receiver adapted to receive a composite color television signal including in combination, first electron valve means having input, output and common electrodes, second electron valve means having input, output and common electrodes, means connecting the common electrode of said first electron valve means to ground reference potential, means providing direct current connection between the common electrode of said second electron valve means and the output electrode of said first electron valve means, means for deriving keying pulses from the line sweep system of said receiver, said keying pulses occurring in time coincidence with the blanking interval of said composite color television signal, means for coupling said keying pulses to the input electrode of said first electron valve means, said first electron valve means being thereby gated into conduction to produce substantially constant current flow in said second electron valve means during said blanking interval, means coupling a chroma signal including color subcarrier sideband components and color burst reference signal components to the input electrode of said second electron valve means, with color burst reference signals occurring during said blanking interval being amplified by said second electron valve means, and circuit means coupled to the output electrode of said second electron valve means to derive amplified color burst reference signals therefrom.

5. Color burst reference signal separator circuit means for use in a television receiver adapted to receive a composite color television signal including in combination, first electron valve means having control grid, anode and cathode electrodes, second electron valve means having at least control grid, anode and cathode electrodes, means connecting the cathode electrode of said first electron valve means to ground reference potential, means providing direct current coupling between the cathode electrode of said second electron valve means and the anode electrode of said first electron valve means, means providing a high frequency bypass between the cathode electrode of said second electron valve means and ground reference potential, means for deriving keying pulses from the line sweep system of said receiver, said keying pulses occurring in time coincidence with the blanking interval of said composite color television signal, means coupling said keying pulses to the control grid electrode of said first electron valve means, said first electron valve means being thereby gated into conduction to produce substantially constant anode current flow in said second electron valve means during said blanking interval, means coupling a chroma signal including color subcarrier sideband components and color burst reference signal components to the control grid electrode of said second electron valve means, with color burst reference signals occurring during the blanking interval of said composite color television signal being amplified by said second electronic valve means, and circuit means coupled to the anode electrode of said second electron valve means to derive amplified color burst reference signals therefrom.

6. Color burst reference signal separator circuit means for use in a television receiver adapted to receive a composite color television signal including in combination, a vacuum tube triode, a vacuum tube pentode, means connecting the cathode electrode of said triode to ground reference potential, means providing direct current connection between the cathode electrode of said pentode and the anode electrode of said triode, high frequency bypass means coupling the cathode electrode of said pentode to ground reference potential, means for deriving keying pulses from the line sweep system of said receiver, said keying pulses occurring in time coincidence with the blanking interval of said composite color television signal, means coupling said keying pulses to the control grid electrode of said triode, said triode being thereby gated into conduction to produce substantially constant anode current flow in said pentode during said blanking interval, means coupling a chroma signal including color subcarrier sideband components and color burst reference signal components to the control grid electrode of said pentode, with color burst reference signals occurring during the blanking interval of said composite color television signal being amplified by said pentode, and circuit means coupling the anode electrode of said pentode to derive amplified color burst reference signals therefrom.

References Cited by the Examiner

UNITED STATES PATENTS

| | | | |
|---|---|---|---|
| 2,713,608 | 7/1955 | Sonnenfeldt | 178—5.4 |
| 2,923,766 | 2/1960 | Sonnenfeldt | 178—5.4 |

DAVID G. REDINBAUGH, *Primary Examiner.*

J. A. O'BRIEN, *Assistant Examiner.*